No. 835,585. PATENTED NOV. 13, 1906.
H. UFFMANN.
BALLING DEVICE FOR TRANSPLANTING TREES.
APPLICATION FILED SEPT. 20, 1906.

Witnesses
A. B. Decker
M. Decker

Inventor
Heinrich Uffmann
By Delbert H. Decker
Attorney

UNITED STATES PATENT OFFICE.

HEINRICH UFFMANN, OF HICKSVILLE, NEW YORK.

BALLING DEVICE FOR TRANSPLANTING TREES.

No. 835,585.  Specification of Letters Patent.  Patented Nov. 13, 1906.

Application filed September 20, 1906. Serial No. 335,424.

*To all whom it may concern:*

Be it known that I, HEINRICH UFFMANN, a citizen of the United States, residing at Hicksville, in the county of Nassau and State of New York, have invented a new and useful Improvement in Balling Devices for Transplanting Trees, of which the following is a specification.

This invention relates to tree-transplanting devices, and particularly to devices used for retaining a ball of earth about the roots of the tree, whereby a tree of considerable size may be moved without disturbing the hold of the roots upon the soil, and therefore without setback to the tree in transplanting.

The object of the invention is to construct a device for this purpose which shall be easily handled, readily applied, and effective for the purpose stated; and to this end the invention consists in the structure substantially as herein set forth and claimed.

This balling device is preferably made from a stout fabric—such, for instance, as sailcloth—and this may be reinforced by rope.

Figure 1:
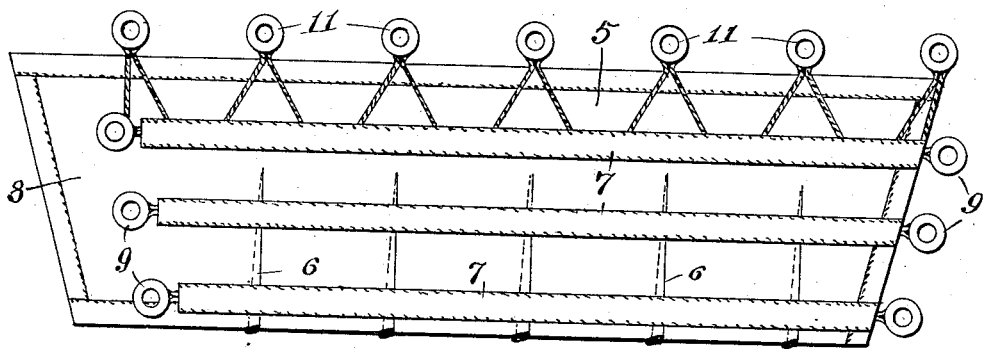
Figures 2, 3:
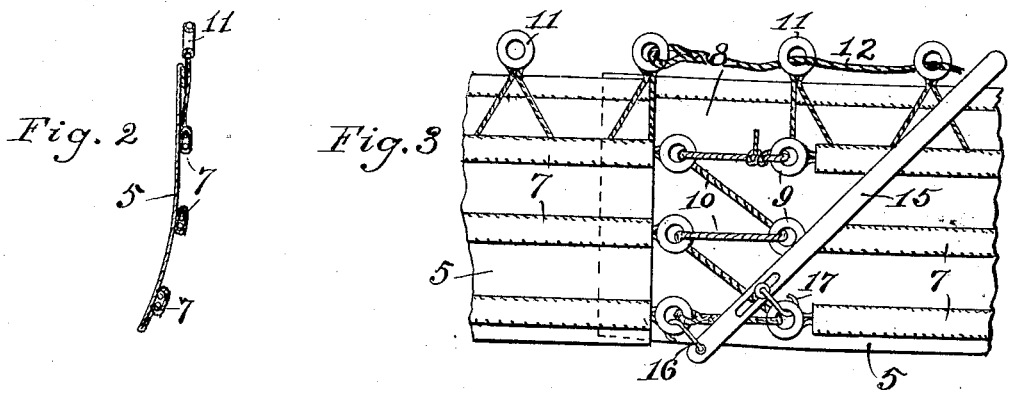

In the accompanying drawings, which form a part of this specification, Figure 1 represents in elevation the preferred mode of making the balling device. Fig. 2 represents a vertical transverse section thereof. Fig. 3 shows the way in which the ends of the device when it consists of one piece, or the adjacent ends of sections when it consists of several pieces, are joined together and tightened around the ball, and Fig. 4 represents in perspective the device as applied to the ball of earth about the roots of a tree to be moved.

The balling device is preferably made in two or three sections, each of which may consist of a strip of canvas 5, preferably hemmed at its edges. This strip is preferably gored, as shown, so as to make the bottom of the device when placed about the ball smaller than the top. It is also preferable to accentuate the gore by gathering each section somewhat throughout its lower portion by stitching darts therein, as indicated at 6. This gives an inward trend to the bottom, as seen in Fig. 2.

Reinforcing ropes or cords are secured to the sections preferably by means of piping 7, which preferably terminate short of one end of the section, so as to leave an overlap or flap 8, whereby to span the opening between the ends of two sections, as seen in Fig. 3, and thereby confine the earth at that point. To the ends of these ropes or cords are secured thimbles 9, through which a tightening-rope 10 may be laced.

Figure 4:
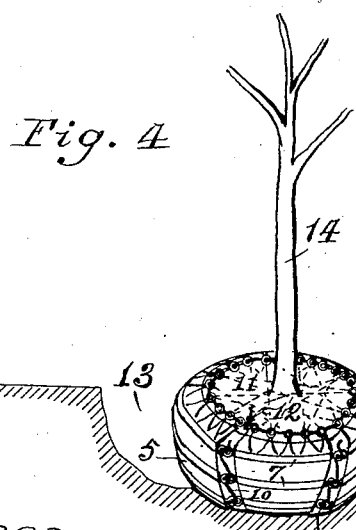

To the upper edge of each section other thimbles 11 are secured, preferably by ropes or cords sewed down on the canvas for some distance to give a good hold therefor and to better aid in gathering in the top of the device by means of the rope 12, laced through said thimbles in any desired manner, as shown in full lines or indicated in dotted lines, Fig. 4.

When a tree is to be transplanted, a trench, as 13, is dug around it at a distance from the bowl 14, such as will avoid cutting the roots or loosening the earth therefrom. Then the canvas sections are laced together in sufficient number to inclose the ball left about the roots. The sections are then drawn tightly together and so held by the ropes 10. To assist in drawing the sections together, a lacing-lever may be used. Such a lever is seen in Fig. 3, and consists of a handle 15, having a hook 16 at its lower end and a hook 17 above it, the latter being preferably mounted to slide in a slot in the handle, so as to give a wide reach for the hooks and yet provide for bringing them closely together on the manipulation of the handle. As shown, the lower hook is placed in a thimble on one section and the upper hook in a thimble on the adjacent section. Then by moving the upper end of the handle to the left the two thimbles will be brought closely together, where they may be held by means of the lacing-rope 10. The lever may then be shifted to the next pair of thimbles, and so on.

For moving small trees the sections may be but two feet long and ten inches wide, and they may be graded from there up to twelve feet long and twenty-six inches wide, and any number of sections may be used, as indicated in Fig. 4.

The invention claimed is—

1. A transplanting balling device consisting of a strip of fabric provided with means for tightening it about the ball of earth and roots.

2. A transplanting balling device consisting of sections of flexible material and means for tightening said sections together about the ball of earth and roots.

3. A transplanting balling device consisting of gored sections of canvas provided with means for lacing them together at their ends.

4. A transplanting balling device consisting of gored sections of flexible material provided with means for connecting them together end to end and with means for gathering the top edge thereof over the ball.

5. A transplanting balling device consisting of gored sections of canvas reinforced by ropes or cords secured lengthwise thereof and having at their ends means for securing a lacing-rope.

6. A transplanting balling device consisting of gored canvas sections laced together at their ends and having overlapping flaps spanning the space between the ends.

7. A lacing-lever consisting of a handle having a hook at one end and another hook mounted in a slot at a distance from that end for the purpose specified.

In testimony whereof I have signed my name to this specification in the presence of two subscribing witnesses.

HEINRICH UFFMANN.

Witnesses:
JOHN LAUCK,
C. L. SIMONSON.